(12) United States Patent
Riede (10) Patent No.: US 10,349,781 B2
(45) Date of Patent: Jul. 16, 2019

(54) ROTOR HAVING FREEWHEEL

(71) Applicant: SWIZZZPROZZZ VERTRIEBS AG, Stansstad (CH)

(72) Inventor: Hans-Jürgen Riede, Lyss (CH)

(73) Assignee: SwizzzProzzz Vertriebs AG, Stansstad (CH)

( * ) Notice: Subject to any disclaimer, the term of this patent is extended or adjusted under 35 U.S.C. 154(b) by 541 days.

(21) Appl. No.: 14/417,489

(22) PCT Filed: Jul. 17, 2013

(86) PCT No.: PCT/EP2013/065102
§ 371 (c)(1),
(2) Date: Jan. 26, 2015

(87) PCT Pub. No.: WO2014/016183
PCT Pub. Date: Jan. 30, 2014

(65) Prior Publication Data
US 2015/0201811 A1  Jul. 23, 2015

(30) Foreign Application Priority Data
Jul. 24, 2012  (CH) ..................................... 1234/12

(51) Int. Cl.
*A47J 43/00* (2006.01)
*A47J 43/07* (2006.01)
(Continued)

(52) U.S. Cl.
CPC .......... *A47J 43/0722* (2013.01); *A47J 43/08* (2013.01); *A47J 43/1068* (2013.01); *F16D 41/185* (2013.01)

(58) Field of Classification Search
CPC .... A47J 43/0722; A47J 43/08; A47J 43/1068; F16D 41/185
(Continued)

(56) References Cited

U.S. PATENT DOCUMENTS 3,368,800 A * 2/1968 Barnard, Jr. .......... A47J 43/046
241/282.2
4,700,903 A * 10/1987 Henn .................... A47J 43/046
241/101.2
(Continued)

FOREIGN PATENT DOCUMENTS

CN  102481071 A  5/2012
CN  202224113 U  5/2012
(Continued)

OTHER PUBLICATIONS

US 6,986,477 B2, 01/2006, Holcomb et al. (withdrawn)

*Primary Examiner* — Faye Francis
(74) *Attorney, Agent, or Firm* — Pauley Erickson & Kottis (57) ABSTRACT

An operative insert for a device for processing foods and a device for processing foods including such an operative insert, the device having a receptacle for the operative insert that is driven rotationally about an axis of rotation (R), to which receptacle the operative insert can be detachably fastened in a torque-locked manner by a drive interface, wherein the operative insert bears at least one working element, which can be driven rotationally in a working direction by the drive interface and which can be decoupled from the drive interface in regard to the rotational motion by a freewheel when the direction of rotation of the drive interface is reversed.

19 Claims, 7 Drawing Sheets

(51) Int. Cl.
*A47J 43/10* (2006.01)
*A47J 43/08* (2006.01)
*F16D 41/18* (2006.01)

(58) Field of Classification Search
USPC .................................. 241/282.1, 282.2, 92
See application file for complete search history.

(56) References Cited

U.S. PATENT DOCUMENTS

| | | | |
|---|---|---|---|
| 4,723,719 A * | 2/1988 | Williams | A47J 43/044 |
| | | | 241/282.2 |
| 4,813,624 A * | 3/1989 | Williams | A47J 43/044 |
| | | | 241/282.2 |
| 4,984,747 A * | 1/1991 | Lechner | B02C 18/12 |
| | | | 241/101.78 |
| 5,156,084 A | 10/1992 | Lin | |
| 7,059,553 B2 * | 6/2006 | Mueller | A47J 43/1025 |
| | | | 241/168 |
| 7,264,189 B2 | 9/2007 | Holcomb et al. | |
| 7,673,829 B2 * | 3/2010 | Holcomb | A47J 43/07 |
| | | | 241/282.2 |
| 7,905,438 B2 * | 3/2011 | Holcomb | A47J 43/07 |
| | | | 241/282.2 |
| 8,402,886 B2 * | 3/2013 | Herren | A47J 43/105 |
| | | | 241/101.1 |
| 2006/0260895 A1 * | 11/2006 | Traner | F16D 41/185 |
| | | | 192/43 |
| 2009/0045274 A1 | 2/2009 | So et al. | |
| 2009/0090254 A1 | 4/2009 | Herren | |
| 2012/0125207 A1 | 5/2012 | Taguchi et al. | |

FOREIGN PATENT DOCUMENTS

| | | |
|---|---|---|
| JP | 2011-45411 | 3/2011 |
| JP | 2011045411 | 3/2011 |
| JP | 2012-102780 A | 5/2012 |
| WO | WO 2007/128153 A1 | 11/2007 |
| WO | WO 2010/150263 A2 | 12/2010 |
| WO | WO 2011/123530 A2 | 10/2011 |
| WO | WO 2011/157511 A1 | 12/2011 |

* cited by examiner

ROTOR HAVING FREEWHEEL

BACKGROUND OF THE INVENTION

Field of the Invention

The invention relates to an operative insert having processing means for processing foodstuffs in a processing device and to a device for processing foodstuffs having such an operative insert.

Discussion of Related Art

The prior art discloses rotors for manually operated devices for processing foodstuffs which bear various processing means for example for cutting, peeling, blending or tossing fruit, vegetables and herbs. Some of these devices, provided with special processing means, can also be used for kneading dough, for mixing sauces or for whipping cream. These devices are usually driven by means of crank drives, cord pull drives, toggle lever drives or humming top drives.

U.S. Pat. No. 5,156,084A discloses a manually operated food processor, which comprises a working container with a central support axle, a cover having a hand-crank drive and a number of various exchangeable rotors with processing means. In addition to a draining basket to drain salad, a cutting rotor having a plurality of radially fastened cutting knives and a mixing rotor having likewise radially arranged stirring blades are proposed. The various rotors are each pushed onto a central bearing journal in the working container and, when the cover is pushed onto the working container, are detachably connected to the crank drive in the cover by way of a positively locking tool interface. The rotational movement of the crank is transmitted via a step-up transmission to a central drive shaft, which is pushed through the base of the cover and is provided at the bottom end with a connecting pin having an external square. Depending on the desired foodstuffs processing, the rotors can be exchanged very quickly and easily. As a result of the proposed crank drive, the rotational movements are transmitted to the rotor with step-up, such that the rotational speed of the rotor is significantly higher than the rotational speed of the crank. The direct connection makes it possible for the rotor which is used in each case to be rotated optionally in various directions depending on the direction of rotation of the crank. Such changes in direction of rotation are particularly desirable when stirring or emulsifying sauces or when tossing salad or herbs. When the cutting rotor is used, the cutting knives have to be provided with a cutting edge on both sides in order to prevent blocking in the event of a change in direction of rotation. The bent knife position has additionally proved to be unfavourable, however, for operation in both directions of rotation.

The simple design, the low production costs and the mains-independent operation make such manually operated food processors popular kitchen devices, not only in emerging countries, but also in industrial countries.

In order to make it easier to cut fruit and vegetables, in particular at the start of the cutting operation, WO11157511A proposes an operative insert for devices which process foodstuffs. These devices comprise a bowl and a receptacle for the operative insert which is driven in rotation about an axis of rotation. This rotating operative insert is formed in such a manner that foodstuffs located in the bowl can be processed and/or handled, wherein the operative insert has a support body, which can be connected or is connected to the receptacle, and at least one tool, which is mounted on the support body and is movable as a result by the processing and/or handling, and which is displaceable counter to the force of a resetting means from a position of rest into a working position.

The apparatus for cutting foodstuffs which is known from US 2009/0090254 A1 eliminates the disadvantage of previously known apparatuses that, in the case of said apparatuses, a relatively large initial torque has to be applied, particularly in the case of hard foodstuffs, for instance in the form of onions or potatoes, in order to break the large, hard pieces up into smaller pieces which are easier to process. In order to avoid this, pivotable knives are arranged on the central rotor shaft, and, depending on the torque generated as a reaction to the externally applied drive torque, can be moved from a position of rest into a working position in a manner pivotable by a limited pivot angle. In the case of the applicant's known apparatus, which is marketed extremely successfully under the trade name SWIZZZPROZZZ®, two or more knives are arranged one above another, can be pivoted relative to one another and are driven about the common axis of rotation. In the position of rest, the knives are congruent one above another in an angular position. At least one of the knives is, however, mounted pivotably on the drive shaft, such that, as a consequence of the initial torque, this knife can initially yield, until it has reached a stop at which it is then likewise driven in rotation. In this way, the torque applied at the start of the processing can be lowered, since not all of the knives immediately engage with the material to be cut with a cutting action.

A disadvantage of the known apparatus, however, is that—as already noted in WO11157511A—the angle by which the knives are mounted in a freely pivotable manner is limited and relatively small.

WO10150263 A2 discloses inserts for food processors which can be used for chopping, mixing, stirring, beating and juicing. A central shaft can be connected to a drive motor by means of a spindle arranged at a first end. The second, opposite end of the central shaft is mounted in a receiving container. Radially protruding blades are fastened to the shaft in a lower region and additional processing tools can be arranged detachably in an upper region. When processing the foodstuffs, the additional processing tools are coupled fixedly to the central shaft. In certain embodiments, the central shaft is provided with a helical groove, in which corresponding cams of the additional processing tools engage and are moved into a locking position upon rotation of the central shaft in a downwards movement.

SUMMARY OF THE INVENTION

It is an object of the present invention to provide an operative insert and a device for processing foodstuffs having such an operative insert which avoid or reduce at least certain disadvantages of the prior art. It is in particular an object of the present invention to propose an operative insert which can be used with a multiplicity of devices for processing foodstuffs with an extremely wide variety of drive mechanisms, decisively reduces the risk of malfunctions and further increases the variability of the processing options.

According to the present invention, these objects are achieved by the elements of the independent claims. Further advantageous embodiments are additionally evident from the dependent claims and the description together with the drawings.

The aforementioned objects are achieved by an operative insert for a device for processing foodstuffs, which has a receptacle for the operative insert which is driven in rotation about an axis of rotation and to which the operative insert can be releasably fastened in a torque-locking manner with a drive interface, and by a device for processing foodstuffs having an operative insert according to the invention.

The drive is preferably a manual drive, as is known from the prior art relating to devices of the generic type, for example with crank drives, cord pull drives, toggle lever drives or humming top drives. The operative inserts according to the invention can also be used in devices with an electric drive, however. The operative insert bears at least one working means, which can be driven rotatably in a working direction by the drive interface and can be uncoupled therefrom in relation to the rotational movement by a freewheel upon reversal of the direction of rotation of the drive interface.

The freewheel of the operative insert is preferably a clamping roller freewheel, a clamping body freewheel, a wrap spring freewheel, a ratchet freewheel or a locking member freewheel.

The latter has proved to be advantageous since it manages with a minimum number of movable parts and can be produced and mounted easily and at low cost. At the same time, however, it ensures that the forces to be transmitted from the drive to the operative insert and ultimately to the working means are transmitted reliably, and uncoupling is effected reliably given the reverse rotational movement, i.e. during the rotation counter to the working direction.

In preferred embodiments, the locking member freewheel comprises a coupling part toothed on the end face and a driver part, wherein the coupling part is arranged between the drive interface and the driver part and is displaceable into a locking position along a support spindle. The coupling part, the drive interface and the driver part are set up in such a manner that torque is transmitted between the drive interface and the driver part in the locking position, wherein coupling means are set up in order to displace the coupling part into the locking position upon rotation of the drive interface in the working direction and in order to enable the displacement of the coupling part from the locking position upon rotation of the drive interface counter to the working direction.

According to further preferred embodiments, the operative insert is provided with a freewheel, in the case of which a corresponding locking toothing is fitted at the end face in each case of the driver part and of the coupling part, these locking toothings having a plurality of bevelled ramps which together have the effect that, in a direction of rotation of the drive interface counter to the working direction, a twisting movement between the coupling part and the driver part leads to axial displacement of the coupling part from the locking position into a release position.

The coupling means comprise spring elements or corresponding positively locking, bevelled surfaces arranged on the drive interface and on the coupling part, which have the effect that, upon rotation of the drive interface in the working direction, a twisting movement between the drive interface and the coupling part leads to axial displacement of the coupling part into a locking position. If a spring element is used, for example a helical spring, the coupling part is pressed against the driver part under the action of spring force, or into the corresponding locking toothing. The transmission of torque between the drive interface and the coupling part can be effected by mounting the coupling part in an axially displaceable and torque-locking manner on or in the drive interface. The coupling part can be provided with an external polygon and be mounted in a corresponding positively locking receiving opening in the drive interface, or it has one or more radial cams which engage into corresponding vertical grooves in a receiving opening of the drive interface and bring about the axial, displaceable anti-twist mounting. In further embodiments, the drive interface is mounted in or on the coupling part and has the corresponding positive locking means.

If a springless, circular coupling means is used according to a further preferred embodiment, at least one stop, preferably a plurality of stops, is or are fitted in each case to the drive interface and to the coupling part, which by rotation in working direction and against the working direction of the drive interface limits or limit a twisting movement between the drive interface and the coupling part and causes or cause torque to be transmitted between the drive interface and the coupling part.

The working means of the operative inserts according to the invention preferably comprise in each case at least one cutting or chopping knife, a blending blade, a peeling arm, a stirring blade, an upward deflector blade or downward deflector blade or a kneading finger. According to preferred embodiments, two to six identical or different working means are arranged on an operative insert. Upward deflector blades and downward deflector blades can thus be arranged extremely advantageously, for example, underneath and above a plurality of cutting knives, for example two or three cutting knives. In another preferred configuration, the operative insert comprises a plurality of elastic peeling arms axially spaced apart from one another or two cutting knives and two blending blades.

According to preferred embodiments, further working means are provided on the operative insert, coupled locked to the drive interface in a torque-locking manner. Whereas the other working means are uncoupled from the drive interface by the freewheel upon the rotational movement of the drive interface counter to the working direction, these further working means inevitably take part in the rotational movements of the drive interface in and counter to the working direction. An upper downward deflector or a lower upward deflector can thereby convey the material to be processed back into the region of the working means, for example the knife blades, locked with the drive interface upon the rotational movement in the working direction. In the case of reverse rotation counter to the working direction, they can be used to scrape adhering remains from the base and/or cover of the working container, whereas the knife blades do not take part in the reverse rotation in the freewheel mode.

The operative inserts according to the invention can be formed in such a manner that the freewheel uncouples the at least one working means from the drive interface and the at least one further working means upon the rotational movement of said drive interface counter to the working direction. It is thereby possible to realize operative inserts in which, for example, a first lower stirring blade reaching deep into the foodstuff to be stirred is activated upon the reverse rotational movement counter to the working direction, whereas an upper stirring blade coupled directly to the drive interface takes part in the rotational movements thereof in and counter to the working direction.

According to preferred embodiments, the operative insert according to the invention comprises a support spindle bearing at least one working means, wherein the support spindle can be driven rotatably in a working direction by the drive interface and can be uncoupled therefrom in relation to the rotational movement by a freewheel upon reversal of the direction of rotation of the drive interface.

It is preferable for at least one working means arranged on a support spindle and acting in the circumferential direction of the support spindle to be pivotable relative to at least one further working means arranged on the support spindle within a limited pivot angle about the support spindle, wherein the working means are preferably oriented radially in relation to the support spindle.

According to preferred embodiments, the freewheel is switchable in and counter to the working direction or completely lockable.

The drive interface is preferably in the form of a drive journal, particularly preferably with a terminal external polygon for reception in the correspondingly shaped receptacle driven in rotation by the drive.

The devices according to the invention for processing foodstuffs comprise a drive, having a receptacle which is driven in rotation about an axis of rotation and to which the operative insert can be releasably fastened in a torque-locking manner by means of a drive interface, and a container for receiving the foodstuffs to be processed, in which the operative insert is preferably mounted with an end lying opposite the drive interface. In further configurations, the receptacle is in the form of a spindle onto which the operative insert is pushed in a releasably fastenable manner with an appropriately adapted drive interface shaped like a hollow cylinder or hollow cone.

The device according to the invention for processing foodstuffs is preferably driven by a manually operable crank drive, cord pull drive, toggle lever drive or humming top drive. The drive can comprise a step-up transmission in order to increase the rotational speed from the primary manual drive movement on the crank, cord pull, toggle lever or humming top pusher to the rotational speed of the receptacle.

Since, in the case of the operative inserts according to the invention, the sensitive working means are already protected by the freewheel against damage in the case of incorrect manipulations, i.e. primarily against rotation counter to the intended working direction, it is possible to dispense with a freewheel in the drive in the case of the devices according to the invention.

BRIEF DESCRIPTION OF THE DRAWINGS

The invention is explained hereinbelow with reference to figures which show merely exemplary embodiments.

DETAILED DESCRIPTION OF THE INVENTION

Figure 1:
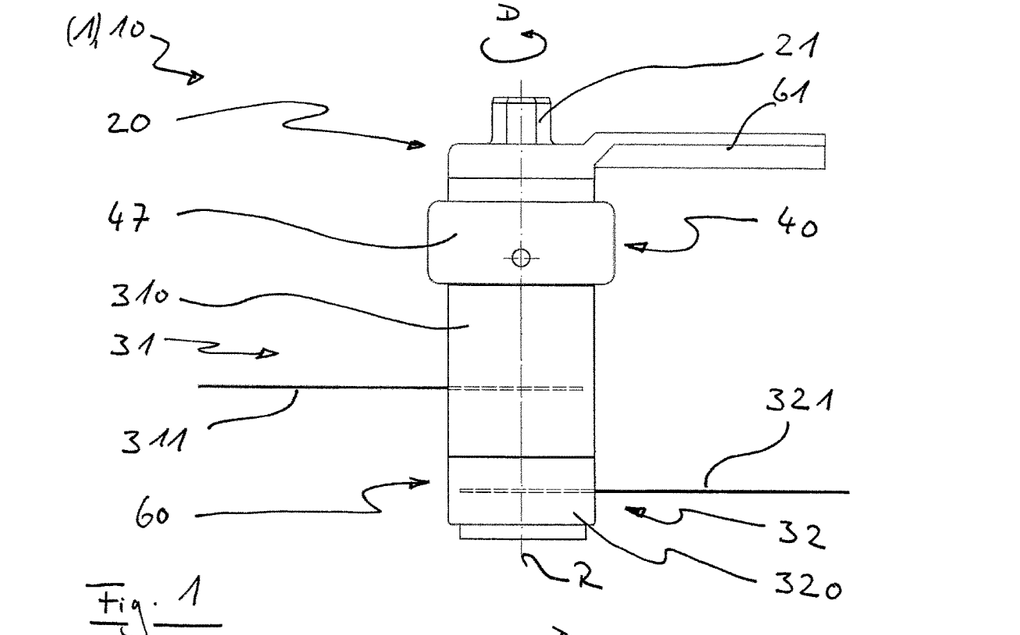
FIG. 1 is a side view schematically showing an operative insert in the form of a cutting rotor having two cutting knives.

FIG. 1 shows an operative insert 1 according to the invention in the form of a cutting rotor 10 having two cutting knives 31, 32 which are arranged axially offset in relation to one another approximately horizontally in the radial direction and each comprise a cylindrical knife holder 310, 320, preferably made of plastic, and a knife blade 311, 321. Whereas the two cutting knives 31, 32 are arranged at the lower end of the cutting rotor 10 on a support spindle 60, an upper downward deflector 61 is locked on a drive interface 20. The drive interface 20 comprises a journal 21 at the top with an external hexagon, which is designed for introducing the torque. By virtue of a freewheel 40, which is received completely by a holding bushing 47 and the drive interface 20 in the embodiment shown in FIG. 1, the drive interface 20 and the upper downward deflector 61 are coupled to the two knives 31, 32 in a torque-locking manner upon rotation D in the working direction. In this operating state, all working means 31, 32, 61 rotate about the same axis of rotation R at the same speed in the same direction D.

If the drive interface 20 is rotated counter to the working direction D, merely the upper downward deflector 61 is carried along with it. The freewheel 40 uncouples this rotational movement from the two knives 31, 32 on the support spindle 60, such that these remain in a position of rest braked by applied material to be cut and do not take part in the rotational movement opposite to the working direction FIG. 1A shows an operative insert similar to that shown in FIG. 1 but now also including a lower upward deflector 62 in addition to the upper downward deflector 61.

Figure 1A:
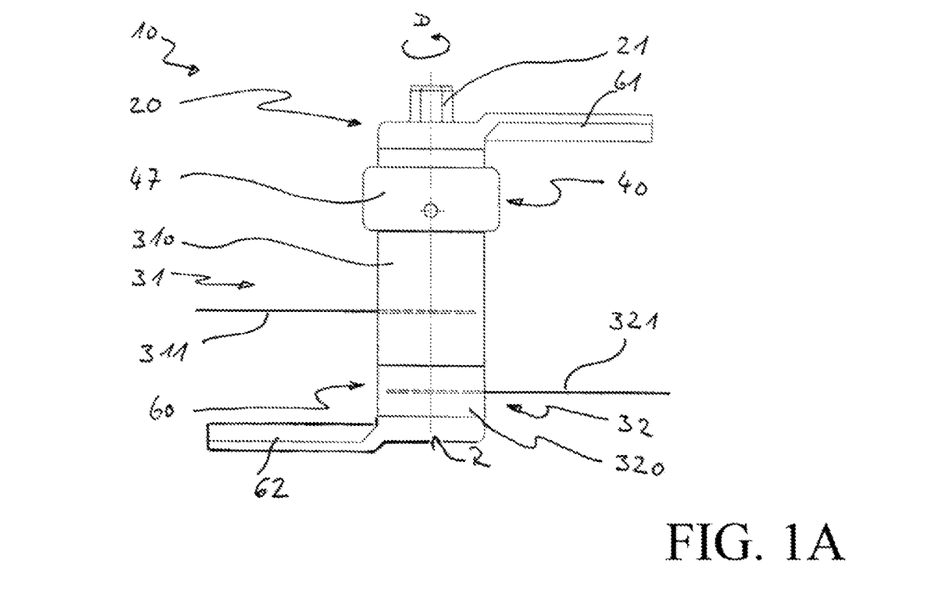
FIG. 1A is a side view schematically showing an operative insert in the form of a cutting rotor having two cutting knives similar to FIG. 1 but now also including a lower upward deflector in addition to an upper downward deflector.
Figure 1B:
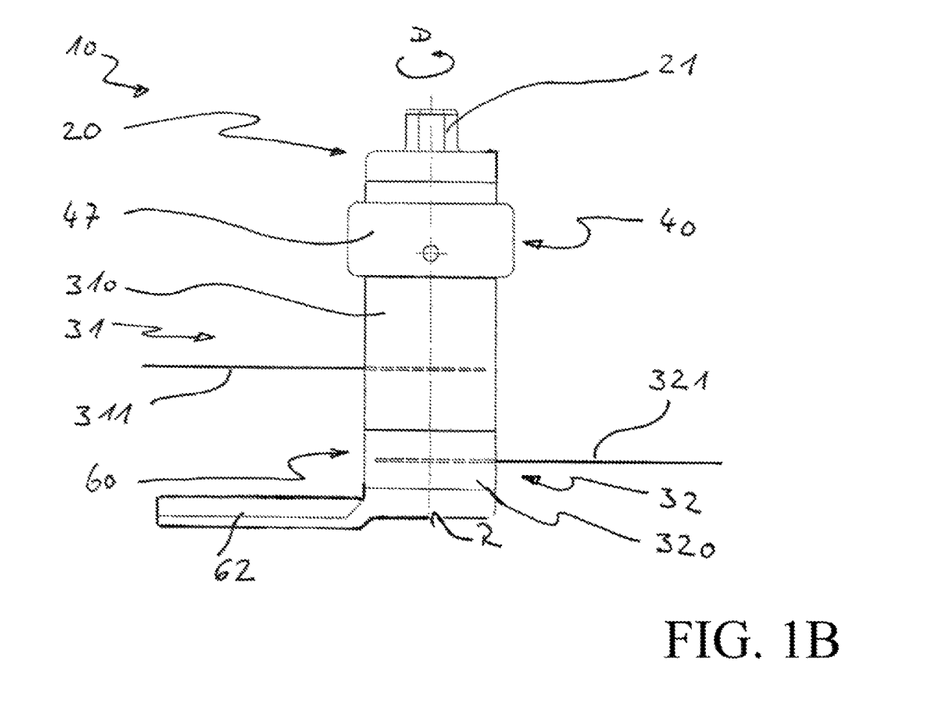
FIG. 1B is a side view schematically showing an operative insert in the form of a cutting rotor having two cutting knives similar to FIG. 1A but now including a lower upward deflector and no upper downward deflector.

FIG. 1B shows an operative insert similar to that shown FIG. 1A but now including a lower upward deflector 62 and no upper downward deflector.

Figure 2:
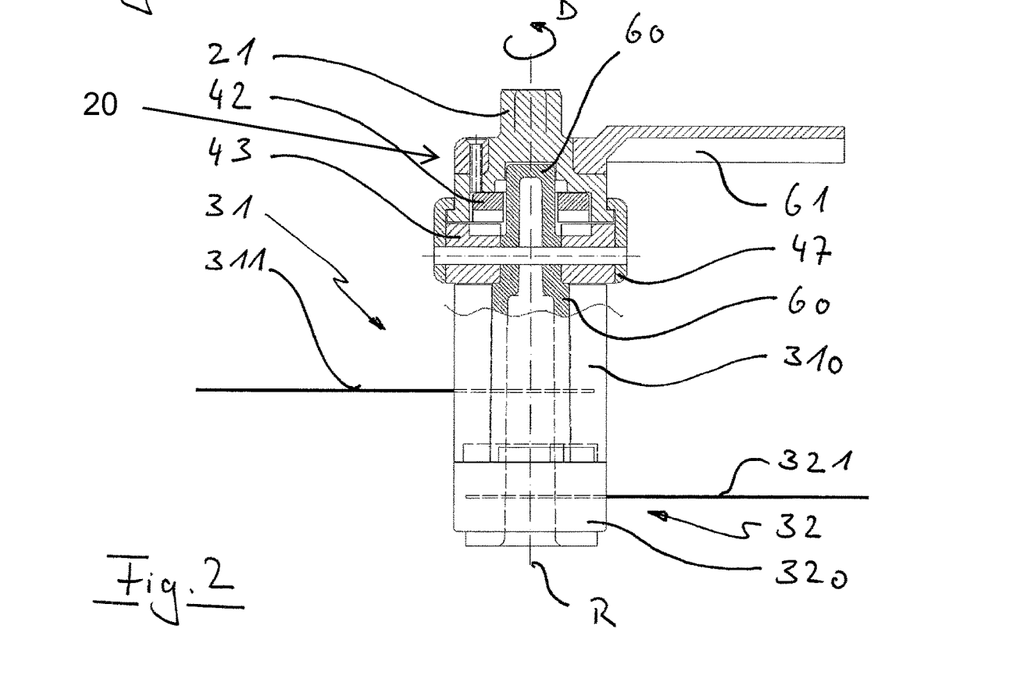
FIG. 2 shows the cutting rotor shown in FIG. 1 in a partially sectional illustration.

The side view shown partially in section in FIG. 2 shows in detail the exact structure of the freewheel 40 in a cutting rotor 10 according to the embodiment shown in FIG. 1. The knife holder 320 of the lower knife 32 is formed integrally with the central support spindle 60. The hollow-cylindrical knife holder 310 of the upper knife 31 is pushed onto said support spindle 60. The upper knife 31 is mounted on the support spindle 60 so as to be pivotable to a limited extent by operative means, as are already known from US 2009/0090254 A1, as mentioned above, and can be moved from a position of rest into a working position in a manner pivotable by a limited pivot angle.

According to further preferred embodiments, which are not shown in the figure, both knives are arranged fixed to the support spindle.

In the case of both configurations relating to the mobility of the cutting knifes 31, 32, the support spindle 60 is connected in the upper region to a driver part 43 in a torque-locking manner, passes through it and protrudes upward somewhat out of the driver part 43. A coupling part 42 is pushed freely rotatably onto the support spindle 60 at the top. The support spindle 60 also passes through the coupling part 42 and protrudes by way of its free upper end into a circular-cylindrical receiving opening in the drive interface 20 on the underside. By virtue of the holding bushing 47, the drive interface 20 and the support spindle 60 are held in a defined axial position and cannot be moved apart axially. To this end, an upper collar of the holding bushing 47 engages behind a lower peripheral flange on the drive interface 20 in such a manner that a low-friction rotation about the axis R is made possible, but displacement in the axial direction is made impossible.

Figures 3, 4:
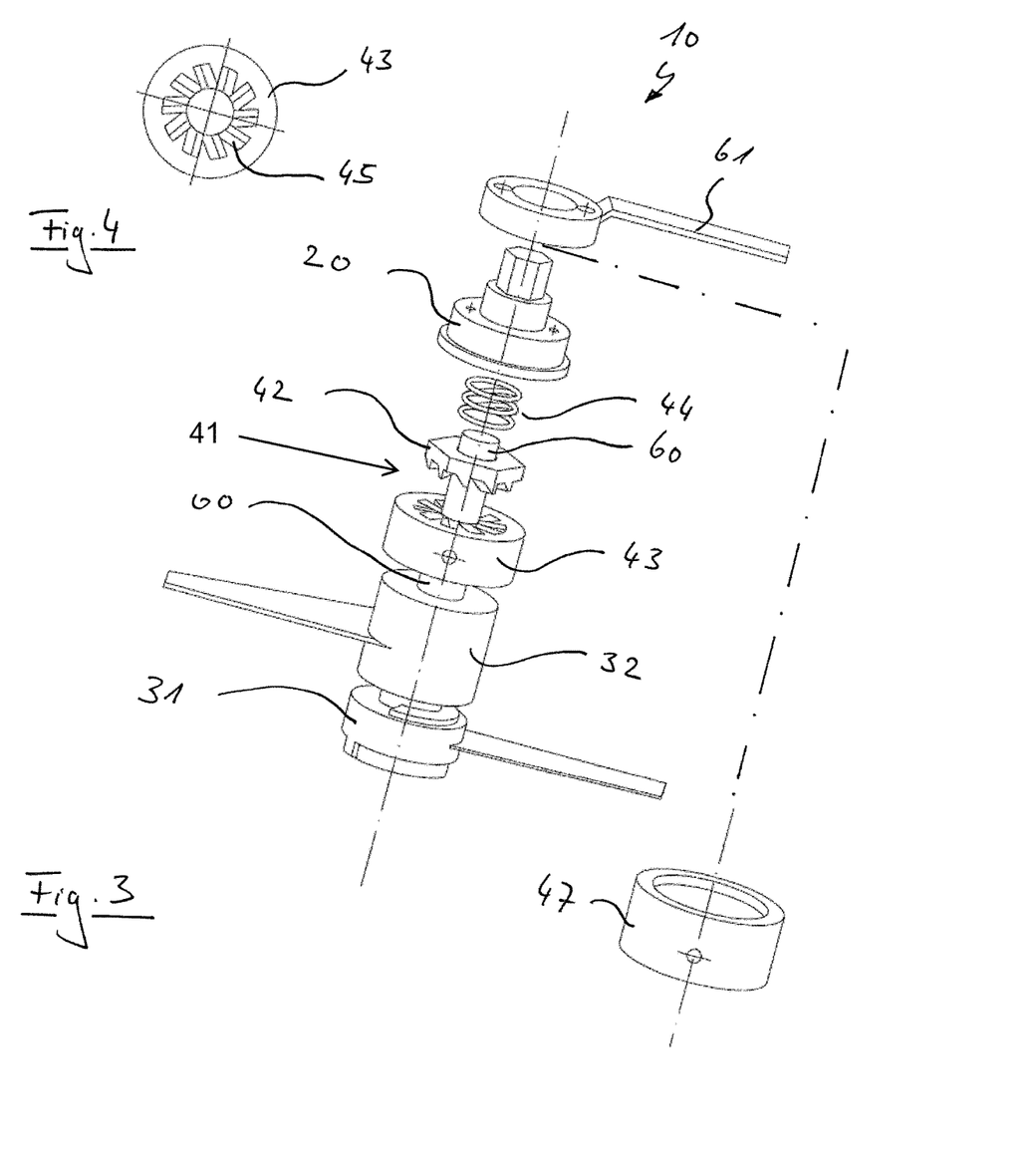
FIG. 3 shows the cutting rotor in an exploded view, with a holding bushing which is arranged underneath an upper downward deflector in the assembled state being shown on the right on its own.
FIG. 4 is a view of a driver from above.

The structure of a freewheel according to a preferred embodiment of the present invention in the form of a locking member freewheel 41 is shown in the exploded view in FIG. 3. The locking member freewheel 41 comprises a coupling part 42 toothed on the end face and a driver part 43, the coupling part 42 being arranged between the drive interface 20 and the driver part 43. Whereas the driver part 43 is fastened fixedly to the support spindle 60 and can be moved neither radially nor axially in relation to the support spindle, the coupling part 42 is mounted such that it can be displaced along and rotated about the support spindle 60. The coupling part 42, the drive interface 20 and the driver part 43 are set up in such a manner that, in locking position, the toothing on the end face of the coupling part 42 and on the end face of the driver part 43 engage into one another in a torque-locking manner and torque is transmitted between the drive interface 20 and the driver part 43. The engagement is ensured by a coupling means in the form of a helical spring 44, which presses the axially movable coupling part 42 in the direction of the driver part 43.

FIG. 3 also shows the receptacle 2 associated with the cutting rotor 10.

Figure 5:
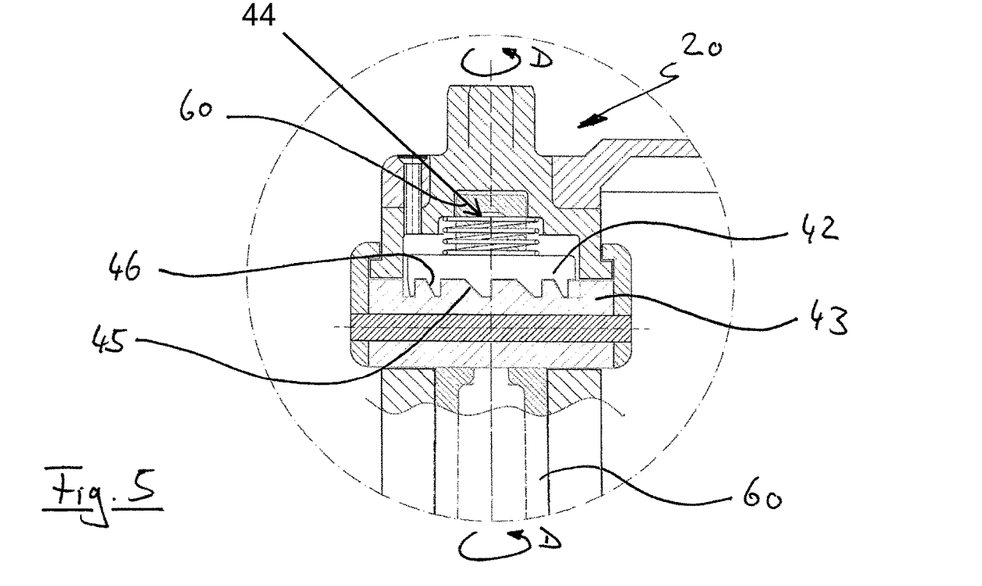
FIG. 5 shows the cutting rotor as shown in FIG. 2 in longitudinal section in the region of a freewheel in the locked state.
Figure 6:
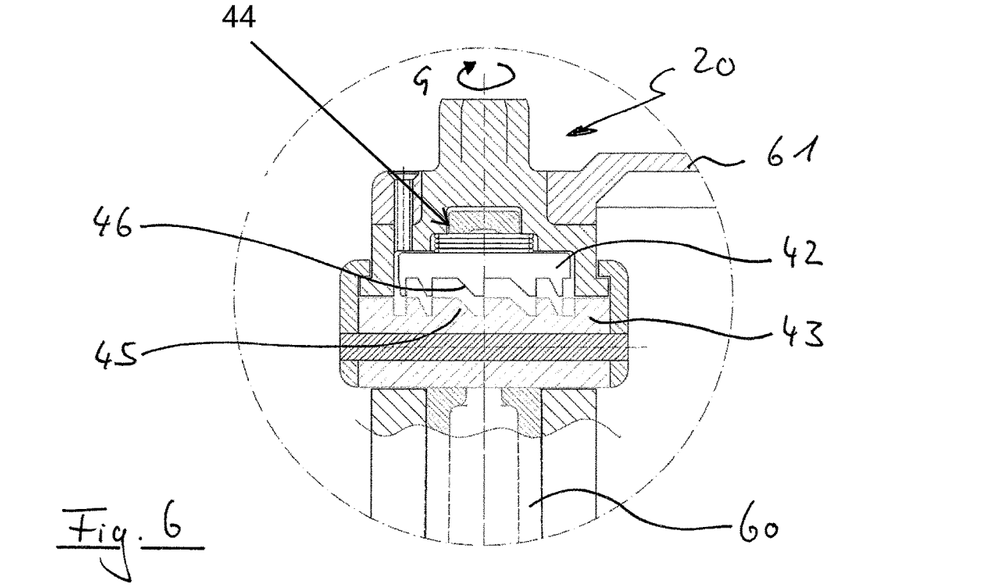
FIG. 6 shows the cutting rotor as shown in FIG. 2 in longitudinal section in the region of the freewheel in the freewheel state, the coupling part being situated in a release position.

FIG. 4 shows a view of the driver from above comprising the driver part 43 and a ramp 46. FIG. 5 shows, with reference to an enlarged detail in the region of the freewheel, that the coupling part 42 and the driver part 43 engage into one another by way of the toothings on the end face in the engaged or locking position and transmit the torque by way of axial locking surfaces. The drive interface 20 and the support spindle 60 which is coupled thereto via the coupling part 42 and the driver part 43 rotate in the working direction D in this position. Upon rotation of the drive interface 20 counter to the working direction D, the coupling part 42 and the driver part 43 are pressed apart in the axial direction by a plurality of interacting ramps 45, 46. Since only the coupling part 42 is mounted axially movably on the support spindle 60, it is pushed counter to the force of the spring 44 upward from the locking position into the release position shown in FIG. 6. Whereas the drive interface 20, the upper downward deflector 61 and the coupling part 42 rotate in direction G counter to the working direction D, the support spindle 60 and the knives or other working means arranged thereon remain in their current position upon application of an external braking force, and do not co-rotate.

Figure 7:
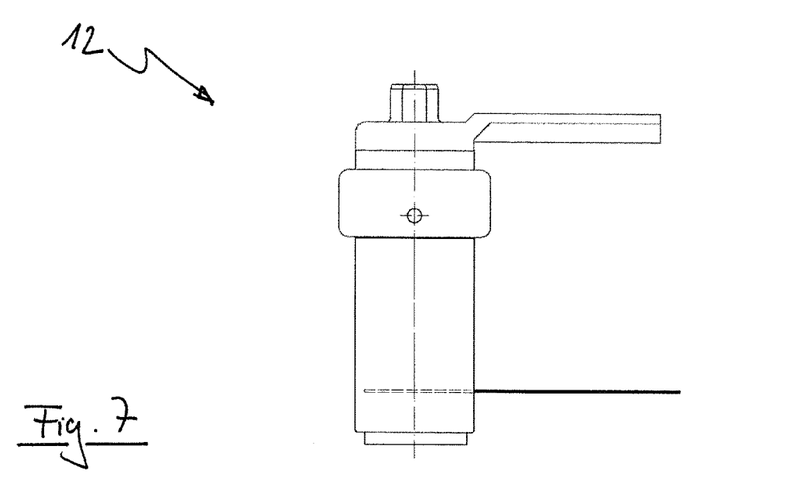
FIG. 7 is a side view schematically showing an operative insert according to a further embodiment of the invention in the form of a cutting rotor having an upper downward deflector and a cutting knife.

FIG. 7 shows a further operative insert in the form of a cutting rotor 12 having a single knife on a support spindle and an upper downward deflector on the drive interface.

Figure 8:
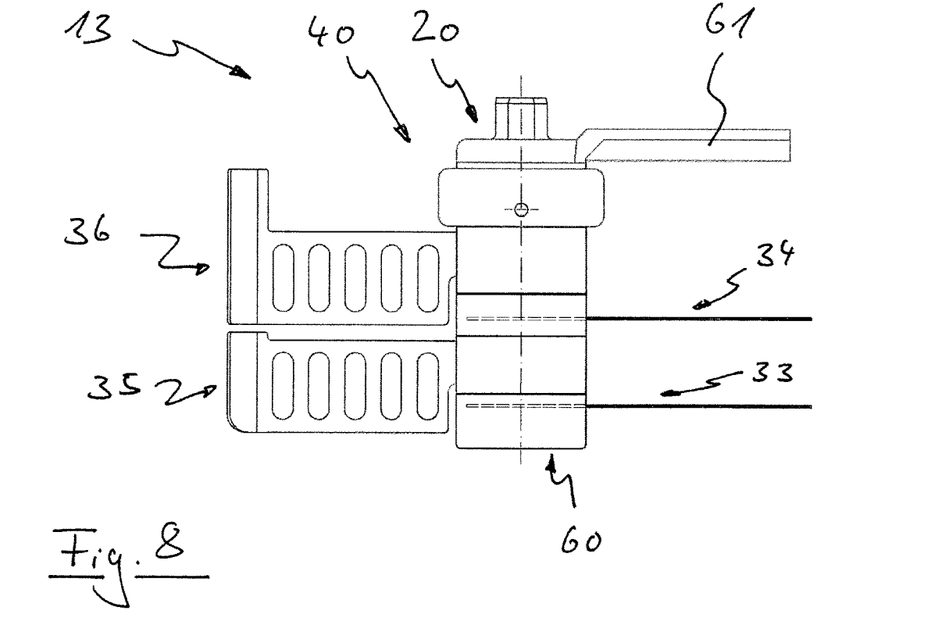
FIG. 8 is a side view schematically showing an operative insert according to a further embodiment of the invention in the form of a combined cutting and blending rotor having an upper downward deflector, two cutting knives and two blending blades.

FIG. 8 shows a further operative insert according to the present invention in the form of a cutting rotor 13 having two knives 33, 34 and two blending blades 35, 36 which are all arranged on a support spindle 60. As has already been described in the description of FIG. 2 as an advantageous embodiment, in the example shown the upper knife 34 and both blending blades 35, 36 are pivotable between a position of rest and a working position each by a limited pivot angle about the support spindle 60 and relative to the lower knife 33 arranged fixedly on the support spindle. It is thereby possible for the rotor 13 to be mounted in a space-saving manner. According to further preferred embodiments, knives and blending blades are fixedly arranged in each case alternately and spaced apart from one another by 90° on the support spindle. In both embodiments, the working means 33-36 and the working spindle 60 are operatively connected via the freewheel 40 to the drive interface 20, which in turn bears the upper downward deflector 61.

Figure 9:
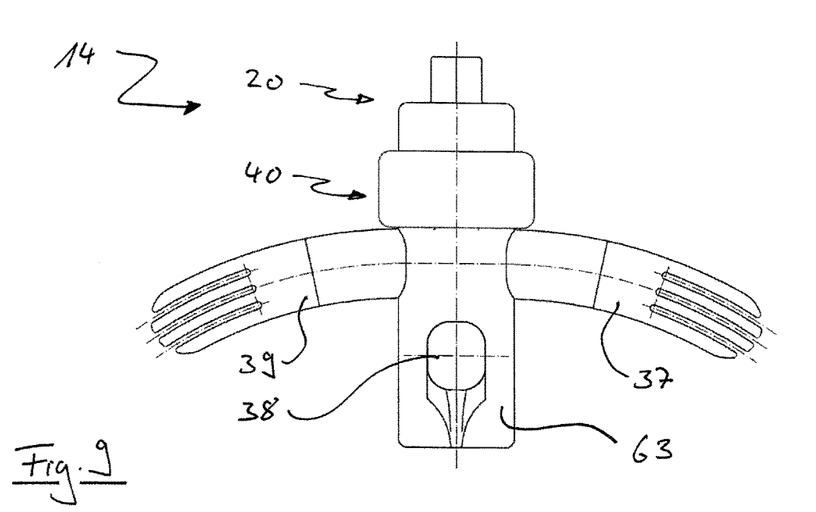
FIG. 9 is a side view of an operative insert according to a further embodiment of the invention in the form of a peeling rotor for peeling garlic.

FIG. 9 shows an operative insert according to a further preferred embodiment, which is in the form of a peeling rotor 14 preferably for peeling garlic. Three elastic peeling arms 37, 38, 39 are arranged on a support spindle 63 and, in turn, are connected via a freewheel 40 to the drive interface 20.

Figure 10:
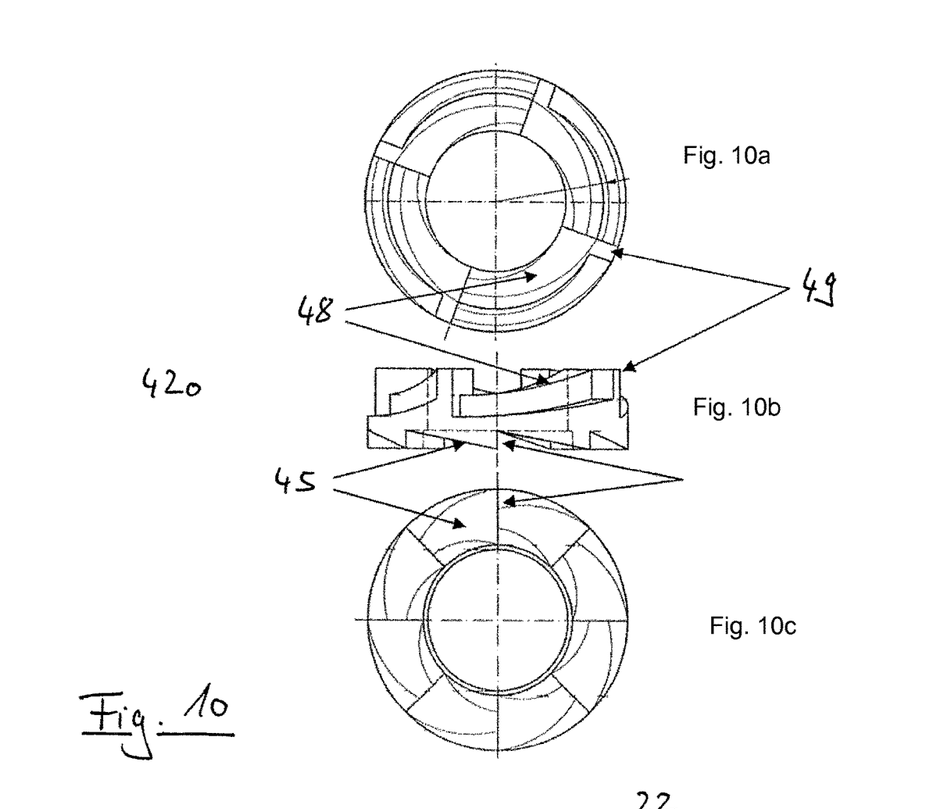
FIG. 10 shows a coupling part in a view from above (FIG. 10a), from the side (FIG. 10b) and from below (FIG. 10c)
Figure 11:
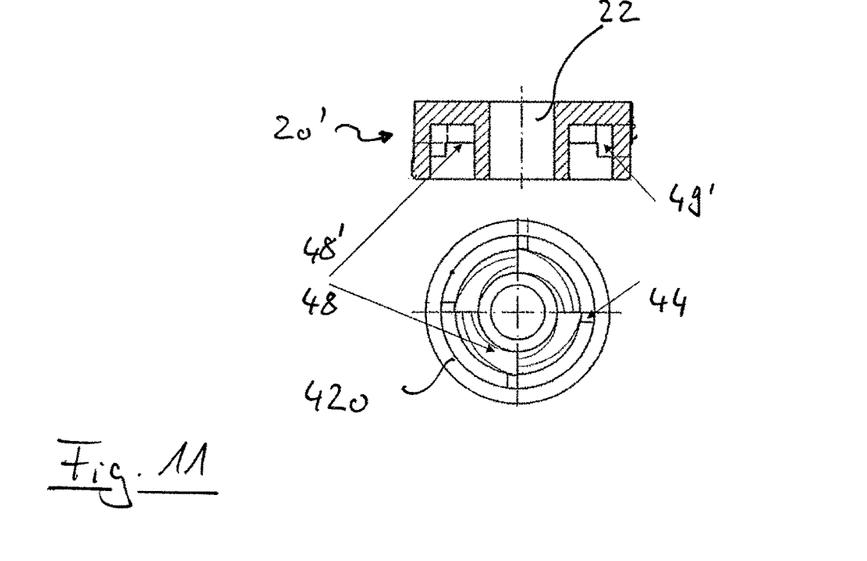
FIG. 11 shows interacting coupling means in the form of a drive interface shown in section and a corresponding coupling part in a view from above.

FIG. 10 shows a coupling part 420 according to a further embodiment in a view from above (FIG. 10*a*), from the side (FIG. 10*b*) and from below (FIG. 10*c*). In the case of the coupling part 420 shown, a coupling means in the form of a spring is no longer required. The coupling part and the drive interface interact for coupling and uncoupling via the corresponding bevelled surfaces 48, 48' which engage into one another as shown in FIG. 11. These have the effect that, upon rotation of the drive interface 20' in the working direction D, a twisting movement between the drive interface 20' and the coupling part 420 leads to axial displacement of the coupling part 420 into a locking position. If the springless, circular coupling means 44 integrally formed on the coupling part on the top side is used, four corresponding axial stops 49, 49' are fitted in each case on the drive interface 20 and on the coupling part 420 and, in the case of rotation D in working direction and in direction G an opposite direction of the working direction of the drive interface 20', limit a twisting movement between the drive interface and the coupling part 420 to about 90° and cause torque to be transmitted between the drive interface 20' with an internal polygon and the coupling part 420.

Figure 12:
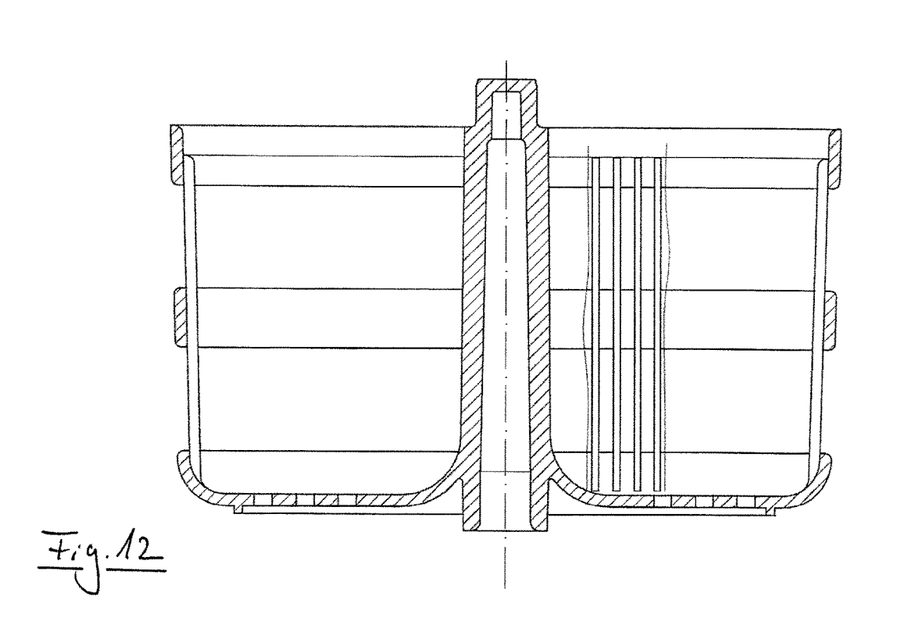
FIG. 12 shows a draining basket according to the prior art in longitudinal section.

Since the operative inserts according to the invention have an integrated freewheel, it is no longer necessary for the drive of the devices according to the invention for processing foodstuffs to be equipped with a freewheel. It is therefore possible for further working means which do not form part of the invention, such as for example the draining basket shown in FIG. 12, to advantageously be used with the devices. The possibility of reversing the direction of rotation improves the draining result quite considerably.

The invention claimed is:

1. An operative insert for a device for processing foodstuffs, the operative insert comprising:
   a drive interface rotatatable in both a working direction and a reverse direction, a deflector locked on the drive interface,
a support spindle driven in rotational movement in a working direction by the drive interface and
a freewheel to uncouple the support spindle from the drive interface relation to the rotational movement,
the operative insert for disposition onto a receptacle of the device, the operative insert driven in rotation about an axis of rotation (R) with the drive interface, and
the support spindle including at least one foodstuff working element, and
wherein, upon rotation of the drive interface in the reverse direction, the support spindle is uncoupled from the drive interface in relation to the rotational movement by the freewheel.

2. The operative insert according to claim 1, wherein the freewheel comprises at least one of a clamping roller freewheel, a clamping body freewheel, a wrap spring freewheel, a ratchet freewheel and a locking member freewheel.

3. The operative insert according to claim 2, wherein the freewheel comprises a coupling part having a toothed end face and a driver part, wherein the coupling part is arranged between the drive interface and the driver part and is displaceable into a locking position, wherein torque is transmitted between the drive interface and the driver part in the locking position, wherein the toothed end face and the driver part are disposed to displace the coupling part into the locking position upon rotation of the drive interface in the working direction and to enable displacement of the coupling part from the locking position to a release position upon rotation of the drive interface in the reverse direction.

4. The operative insert according to claim 3, wherein a plurality of teeth positioned on the toothed end face engage a plurality of recesses in the coupling part, each of the teeth include a beveled ramp which together with the recess whereby, on rotation of the drive interface in the reverse direction, a twisting movement between the coupling part and the driver part axially displaces the coupling part from the locking position into a release position.

5. The operative insert according to claim 3, wherein the coupling part comprise spring elements or beveled surfaces arranged on the drive interface and on the coupling part, whereby on rotation of the drive interface in the working direction, a twisting movement between the drive interface and the coupling part axially displaces the coupling part into the locking position, wherein at least a stop is fitted to the drive interface and to the coupling part whereby rotation of the drive interface in working direction, limits twisting movement between the drive interface and the coupling part and causes torque to be transmitted between the drive interface and the coupling part.

6. The operative insert according to claim 1, wherein the at least one foodstuff working element comprises at least one of at least one knife, a blending blade, a peeling arm, a stirring blade and a kneading finger.

7. The operative insert according to claim 1, wherein the freewheel uncouples the at least one foodstuff working element from the drive interface and the deflector upon the rotational movement of said drive interface in the reverse direction.

8. The operative insert according to claim 1, wherein the at least one foodstuff working element acts in a circumferential direction of the support spindle and is pivotable relative to at least one further foodstuff working element within a limited pivot angle about the support spindle.

9. The operative insert according to claim 1, wherein the freewheel comprises a switchable and/or a lockable freewheel.

10. The operative insert according to claim 1, wherein the drive interface comprises a drive journal.

11. The operative insert according to claim 1, wherein at least one first foodstuff working element arranged on the support spindle and acting in a circumferential direction of the support spindle is pivotable relative to at least one second foodstuff working element within a limited pivot angle about the support spindle, wherein the first and second foodstuff working elements are oriented radially in relation to the support spindle.

12. The operative insert according to claim 1, wherein the drive interface comprises a drive journal with a terminal external polygon.

13. The operative insert according to claim 1, wherein the support spindle bears at least two foodstuff working elements and wherein, upon rotation of the drive interface in the reverse direction, the support spindle bearing the at least two foodstuff working elements is uncoupled from the drive interface in relation to the rotational movement by the freewheel.

14. The operative insert according to claim 1, wherein the deflector is an upper downward deflector or a lower upward deflector.

15. A device for processing foodstuffs comprising a drive, an operative insert, and a container for receiving the foodstuffs to be processed, the device having a receptacle for the operative insert, the operative insert comprising:
a drive interface rotatable in both a working direction and a reverse direction,
a deflector locked to the drive interface,
a support spindle releasably fastened to the drive interface, the support spindle bearing at least one foodstuff working element and driven in rotational movement in a working direction by the drive interface, and
a freewheel to uncouple the support spindle from the drive interface in relation to the rotational movement of the support spindle,
wherein the operative insert is driven in rotation about an axis of rotation (R) with the drive interface, and wherein, upon rotation of the drive interface in the reverse direction, the support spindle is uncoupled from the drive interface in relation to the rotational movement by the freewheel.

16. The device for processing foodstuffs according to claim 15, wherein the drive comprises at least one of a manually operable crank drive, cord pull drive, toggle lever drive and a humming top drive.

17. The device for processing foodstuffs according to claim 13, wherein the operative insert is mounted with an end lying opposite the drive interface.

18. The device for processing foodstuffs according to claim 15, wherein the support spindle bears at least two foodstuff working elements and wherein, upon rotation of the drive interface in the reverse direction, the support spindle bearing the at least two foodstuff working elements is uncoupled from the drive interface in relation to the rotational movement by the freewheel.

19. The device for processing foodstuffs according to claim 15, wherein the deflector is an upper downward deflector or a lower upward deflector.

* * * * *